(12) United States Patent
Tegeder et al.

(10) Patent No.: US 10,049,564 B2
(45) Date of Patent: Aug. 14, 2018

(54) COMMISSIONING AND CONFIGURING CONTROL ELECTRONICS ASSOCIATED WITH ASSETS

(71) Applicant: epro GmbH, Gronau (DE)

(72) Inventors: Uwe Tegeder, Salzbergen (DE); Sven Wermers, Gronau (DE); Hilmar Hermens, Nordhorn (DE)

(73) Assignee: EPRO GMBH (DE)

( * ) Notice: Subject to any disclaimer, the term of this patent is extended or adjusted under 35 U.S.C. 154(b) by 171 days.

(21) Appl. No.: 15/229,288

(22) Filed: Aug. 5, 2016

(65) Prior Publication Data

US 2018/0040235 A1 Feb. 8, 2018

(51) Int. Cl.
*G08C 17/02* (2006.01)
*H04Q 9/00* (2006.01)

(52) U.S. Cl.
CPC .............. *G08C 17/02* (2013.01); *H04Q 9/00* (2013.01); *G08C 2201/20* (2013.01); *G08C 2201/93* (2013.01); *H04Q 2209/40* (2013.01); *H04Q 2209/50* (2013.01)

(58) Field of Classification Search
CPC ........... G08C 17/02; G08C 2201/20; G08C 2201/30; G08C 2201/61; G08C 2201/93; G08C 2201/70; H04Q 9/00; H04Q 2209/40; H04Q 2209/50; H04Q 2209/43; H04Q 2209/47; H04J 3/025; G06F 3/048
See application file for complete search history.

(56) References Cited

U.S. PATENT DOCUMENTS

| 8,370,224 | B2* | 2/2013 | Grewal ................. G05B 19/05 705/29 |
| 9,641,266 | B2* | 5/2017 | Czompo ................ H04J 3/025 |
| 9,665,433 | B2* | 5/2017 | Grewal .............. G06F 11/1448 |
| 9,711,038 | B1* | 7/2017 | Pennebaker, III ..... G08C 17/02 |
| 9,759,812 | B2* | 9/2017 | Nichols .................. G01S 13/91 |
| 2004/0186927 | A1* | 9/2004 | Eryurek ................ G05B 15/02 710/12 |
| 2005/0027377 | A1* | 2/2005 | Lucas ............. G05B 19/41845 700/28 |

(Continued)

OTHER PUBLICATIONS

ATG View—Android Apps on Google Play—4 pages. Emerson Process Management Business. Webpage printed Feb. 15, 2017.

*Primary Examiner* — An T Nguyen
(74) *Attorney, Agent, or Firm* — Luedeka Neely Group, P.C.

(57) ABSTRACT

A mobile device is used in conjunction with control electronics and associated assets and sensors to facilitate the setup or modification of programming in the electronics. The mobile device is used to initially commission sensors by collecting data from the field, such as sensor identity, asset identity and measurement points, and uploading the collected data to the electronics. The mobile device may also be used to select programming in the control electronics for analyzing sensor signals from a particular sensor. The mobile device is also used to collect data from the field for use in linearizing sensor signals when they are received by the control electronics and to transmit maintenance commands to the control electronics thereby causing a programming change in the control electronics to prevent the transmission of a type of command or a type of information, such as a shutdown command or an alarm or alert.

20 Claims, 2 Drawing Sheets

(56) References Cited

U.S. PATENT DOCUMENTS

| | | | | |
|---|---|---|---|---|
| 2008/0015955 | A1* | 1/2008 | Ehrman | G06Q 10/06 |
| | | | | 705/28 |
| 2013/0127904 | A1* | 5/2013 | Dove | G06F 3/0488 |
| | | | | 345/629 |
| 2014/0282015 | A1* | 9/2014 | Nixon | G05B 11/01 |
| | | | | 715/733 |
| 2015/0287318 | A1* | 10/2015 | Nair | G08C 17/02 |
| | | | | 340/5.52 |
| 2015/0350751 | A1* | 12/2015 | McCleland | B81B 7/02 |
| | | | | 340/3.31 |
| 2017/0052524 | A1* | 2/2017 | Kunz | G05B 19/05 |
| 2017/0366875 | A1* | 12/2017 | Arunachalam | H04Q 9/00 |

\* cited by examiner

COMMISSIONING AND CONFIGURING CONTROL ELECTRONICS ASSOCIATED WITH ASSETS

FIELD

The present invention relates to electronics used to monitor and control industrial assets and particularly relates to a mobile device used to commission and configure sensors and control electronics that are associated with industrial assets and typically monitor, protect, and control assets and predict the health of assets.

BACKGROUND

Assets as used herein refers to physical things such as industrial assets which include electric motors, pumps, tanks, pipes, and similar assets. In many environments it is useful to monitor and control the assets with sensors and control electronics performing various functions including the functions of pure monitoring, predicting asset health, protection and control. The term "sensor" is used broadly and refers to any device that produces a signal that contains information regarding an asset. For example a switch could be a sensor. Also, the term "control electronics" is used broadly and refers to a specialized processor or computer that receives signals from sensors and performs one of the functions described above. Thus, control electronics do not necessarily perform a control function. For example, control electronics can perform purely a monitoring function. Typically the control electronics performing those functions are located remotely from the assets and sensors and other devices that are mounted on or near the assets and are hardwired back to the control electronics. The sensors and other devices may also communicate with the control electronics wirelessly, such as Wi-Fi communications, or other types of communications may be used such as fiber optic cables. During the use of such control electronics, it is often necessary or desirable for the user to be in a control room and to also be in the field at the site of the asset. So for example, a user may need to go to the site of the asset and obtain some type of data and then returned to the control room to enter the data into the control electronics. The data acquired in the field is often input by a keyboard in the control room, and human error is quite possible. The need to be present at the asset in the field is particularly prevalent during the original set up or commissioning of equipment (assets) and during maintenance operations that are necessary for the assets. The traditional process of acquiring field data and entering it into the control electronics associated with the assets has been laborious and prone to human error.

SUMMARY

The present invention addresses the problems and difficulties associated with acquiring field data and providing such field data to electronics associated with various assets in the field. In accordance with one embodiment, sensors are disposed on or near assets in the field to produce sensor signals corresponding to characteristics of the assets, and control electronics are connected to the sensors for receiving and analyzing the sensor signals and for transmitting commands or information based on the sensor signals. The control electronics may include machine health control electronics that receive and analyze sensor signals and transmit commands and information related to machine health. Control electronics may also control the assets based on the sensor signals and based on the commands and data provided by the machine health electronics. A mobile device is provided to communicate with the control electronics and the device is configured and programmed to receive on-site data in the field through one or more electronic inputs on the mobile device. The on-site data may correspond to sensor identity, asset identity and sensor signals. The mobile devices are further configured to communicate the on-site data collected in the field to the machine health electronics, either wirelessly or using other communication channels. The mobile device produces and communicates mobile control signals and mobile data to the control electronics based on user input provided through a user interface on the mobile device and based on on-site data collected through the electronic inputs of the mobile device.

The control electronics is configured and programmed with asset data corresponding to the identities and locations of the sensors and the assets, and is also programmed with data or other information related to acceptable conditions of the assets and abnormal conditions of the assets. The control electronics may analyze the sensor signals and determine the condition of the assets based on the asset data, and the control electronics may transmit control commands (such as a shut down command) or machine health data (such as a warning or an alert) when it is determined that an asset is in an abnormal condition. The control electronics will also receive and analyze the on-site data and the mobile control signals provided by the user through the mobile device. Based on one or more of the on-site data and the mobile control signals, the control electronics may modify the issuance of control commands and machine health commands or data. For example, during a maintenance mode the control electronics may prevent shutdowns of the equipment based on commands from the mobile device despite abnormal conditions being indicated by the sensor signals.

The mobile device may also include an electronic input capable of reading indicia, and indicia are provided at the location of each sensor and at the location of each asset to identify the sensors and the assets respectively. The indicia may be a barcode or other type of machine readable code, such as an electronic chip programmed to store and transmit an electronic code. The mobile device may be configured to assist with the setup of the control electronics with respect to a particular asset by identifying the particular asset and one or more associated sensors. The mobile device then transmits information to the control electronics providing the identities of the asset and the associated sensors. The mobile device may also be used to configure the control electronics or an external computer may be used to configure the control electronics after the mobile device has provided the identities of the assets and the associated sensors.

The machine health control electronics may include a plurality of microprocessor-based units programmed to monitor signals from the sensor. In such case, the mobile device may be programmed to select a particular unit to monitor a particular sensor associated with a particular asset. For example, the mobile device may include a graphical representation of the control electronics in which the multiple units of the control electronics are identified. To associate a particular sensor with a particular unit, the user identifies sensor either manually through a user interface or electronically using the electronic code reader. Then, a particular unit of the control electronics is selected by touching the representation of the unit that is displayed on the mobile device.

The mobile device may also be programmed to select a procedure for monitoring and analyzing sensor signals for a particular sensor. To do so, the user selects a procedure and a sensor and transmits the identity of the selected procedure and the identity of the particular sensor to the electronics. The control electronics is preprogrammed with procedures for monitoring and analyzing sensor signals. In response to the identity of the selected procedure provided by the mobile device, the control electronics configures itself to analyze signals from the selected sensor based upon the identity of the procedure and the identity of the particular sensor transmitted from the mobile device.

The mobile device is also optionally programmed to perform a sensor linearization function. The sensor is subjected to a known environmental condition, such as a known displacement for a displacement sensor and the sensor signal is measured under that condition. By subjecting the sensor to a number of different known conditions, such as different displacements, and measuring the sensor signal for each different condition, a plurality of paired values may be created, such as a pair consisting of a displacement value and a sensor signal value. These paired values may be used by the control electronics to perform a linearization function whereby the control electronics can accurately determine the sensor displacement based on the sensor signal. For example, the paired values could be stored as a lookup table, and when a sensor signal is received, the lookup table could be used to look up the displacement value that corresponds to the sensor signal. If the exact value of the sensor signal is not in the table, interpolation may be used to determine a displacement value corresponding to the exact value of the sensor signal. The lookup table may alternatively be used to correct the sensor signal values to create a linear relationship between the sensor signal values and the displacement values.

The linearization function may be performed in multiple different but similar ways. For example, linearization may be performed by storing a code identifying a particular sensor in the mobile device, and receiving and storing a plurality of displacement values corresponding to a plurality of displacements of the particular sensor. Then, a timestamp is recorded in association with each sensor displacement value corresponding to the time at which the displacement value was created. The mobile device also receives and stores a plurality of sensor signal values and timestamps corresponding to magnitudes of the sensor signal from the particular sensor at a plurality of times. The timestamps are used to associate the sensor displacement values with the sensor signal values to produce a plurality of paired values, each paired value including a displacement value and a sensor signal value. The paired values are stored in the mobile device and are then transmitted to the machine health control electronics which is programmed to use the paired values for linearizing the sensor signal from the particular sensor. Alternatively, the paired values may be used in the mobile device to create linearization information, and the linearization information be transmitted to the control electronics for use in linearizing sensor signals. The linearization information may be a function (formula) that may be applied to a sensor signal to linearize the sensor signal. Alternatively the linearization information may be a function (formula) that may be applied to a sensor signal value convert it to a sensor displacement value.

As used herein, the term linearizing is used broadly and refers to the function of determining a relationship between the magnitude of a parameter (e.g. distance) being sensed by a sensor and the value of the sensor signal. Ideally the functional relationship between the sensed magnitude and the sensor signal is linear. However, in reality the relationship is almost never linear. Thus, to linearize a sensor signal, a number of paired values is determined for each sensor, where each paired value includes the actual magnitude of the parameter being sensed and the value of the sensor signal at the magnitude being sensed. These paired values are used to interpret the sensor signal values and accurately determine the actual magnitude that was sensed at a particular sensor signal value. For example, the paired values may be used to correct the sensor signal and generate a corrected sensor signal that actually bears a linear relationship to the magnitude being sensed. Then, the corrected sensor signal is used to determine the magnitude being sensed using a linear conversion function. Alternatively, the paired values may be used to create a function or a lookup table that is used to convert a particular sensor signal value to a particular parameter magnitude. In this alternative technique the sensor signal value is never corrected to create a linear relationship between the sensor signal and the parameter magnitude, but this technique or function is also considered "linearization" as used in this application.

In the example discussed above, the mobile device is receiving a sensor signal or sensor signal values and using the timestamps to correlate the displacement values of the sensor with the sensor signal values. However, the mobile device may be used to perform the linearization function without actually collecting the sensor signal values. In such case, the sensor will be displaced by known amount, and the mobile device will be used to store the displacement value plus a timestamp indicating the time at which the sensor was displaced by the net amount. At the same time, the control electronics is recording the sensor signal and producing a plurality of time stamped sensor signal values. After the mobile device has collected a desired number of displacement values and the corresponding timestamp for a particular sensor, those displacement values and timestamps are transmitted to the electronics, and the control electronics is programmed to correlate the sensor signal values and the displacement values using the timestamps. In this manner, the control electronics generates a plurality of paired values, each containing a sensor displacement value and a sensor signal value.

This technique is applied for any type of sensor measuring any type of parameter, and the displacement parameter is only used as an example. For example, a temperature sensor could be linearized in the same manner. The sensor would be exposed to a plurality of different temperatures and the parameter in this case would be temperature. The user would input the plurality of different temperature values (parameter values) and either the mobile device or the control electronics would sense the temperature sensor signal value corresponding to each of the temperature values. Thus, a plurality of value pairs is created with each value pair including a temperature and a corresponding sensor signal value.

In accordance with the above embodiments, methods of linearizing or calibrating sensors may be summarized as follows:

1. Workflow without connection from mobile device to the control electronics during data capture in the field
   a. Following a given list of displacement values or input them manually on mobile device
   b. Each time displace the sensor at the given distance physically
   c. Each time press a button on mobile device to get the current timestamp belonging to that displacement
   d. Each time build a pair of values (distance-timestamp)

e. Go to control room and connect and transmit these pairs directly to the appropriate card of the control electronics (not possible in our current setup but maybe possible) or the PC with Machine Studio configuration software installed (in our current setup you further have to choose one out of two possible sensors connected to the card)

f. Either the card or the Machine Studio Software must provide historical sensor signal values with time information (for the card not possible in our current setup but maybe possible)

g. Either the card (not possible in our current setup but maybe possible) or the Machine Studio Software must build the needed pairs of values (distance-sensor signal value) based on the timestamps h. Either the card configures itself (not possible in our current setup but maybe possible) with the new linearization function or the Machine Studio Software sends the new configuration to the card (PC/control electronics must be time synchronized with the mobile device)

2. Workflow with connection (wired, wireless or other) from mobile device to the control electronics during data capture in the field a. Directly connect to the appropriate control electronics in the field (input IP-address or maybe scan readable code at machine)

b. Choose the appropriate card and sensor (one out of two in our current hardware) connected to the card (maybe graphically or out of list or scan readable code at sensor location)

c. Following a given list of displacement values or input them manually on mobile device d. Each time displace the sensor at the given distance physically e. Each time press a button on mobile device to directly build a pair of values (displacement-sensor signal value). The sensor signal value is available all the time through the connection to the electronics.

f. Transmit these pairs directly to the appropriate card of the control electronics (not possible in our current setup but maybe possible) or the PC with Machine Studio configuration software installed g. Either the card configures itself (not possible in our current setup but maybe possible) with the new linearization function or the Machine Studio Software sends the new configuration to the card The mobile device may also be programmed to facilitate maintenance operations for assets. For example, if maintenance is to be performed on a particular asset while it is operating, the maintenance may create an operating condition that would be sensed as an abnormal operating condition. Ordinarily, the control electronics would analyze the sensor signals and determine that the asset was operating abnormally. Thus, the electronic 16 would act according to its programming in response to the abnormal operating condition. One response may be to shut down the asset to stop its operation. A shutdown command would interfere with the maintenance being performed on the asset. To quickly overcome this problem, the mobile device is programmed to produce a maintenance command that is associated with at least one asset. An electronic button is provided on the mobile device to activate the maintenance command which is then transmitted to the electronics. In response to the maintenance command, the control electronics modifies its procedures and programming to prevent the issuance of certain commands or information. For example, the control electronics may be programmed to transmit an alarm indicating that a particular asset is operating abnormally and to simultaneously transmit a command to shut down the particular asset. However, after receiving the maintenance command, the control electronics is programmed to issue a caution alert indicating that a particular asset is undergoing maintenance and that the maintenance is causing the asset to appear abnormal. In such case, the control electronics will not transmit a shutdown command. The mobile device is also programmed to produce a reactivation command when another electronic button is pressed and the reactivation command is transmitted to the electronics, which will alter its programming back to normal and the control electronics will transmit alerts and shutdown commands in accordance with its original programming.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
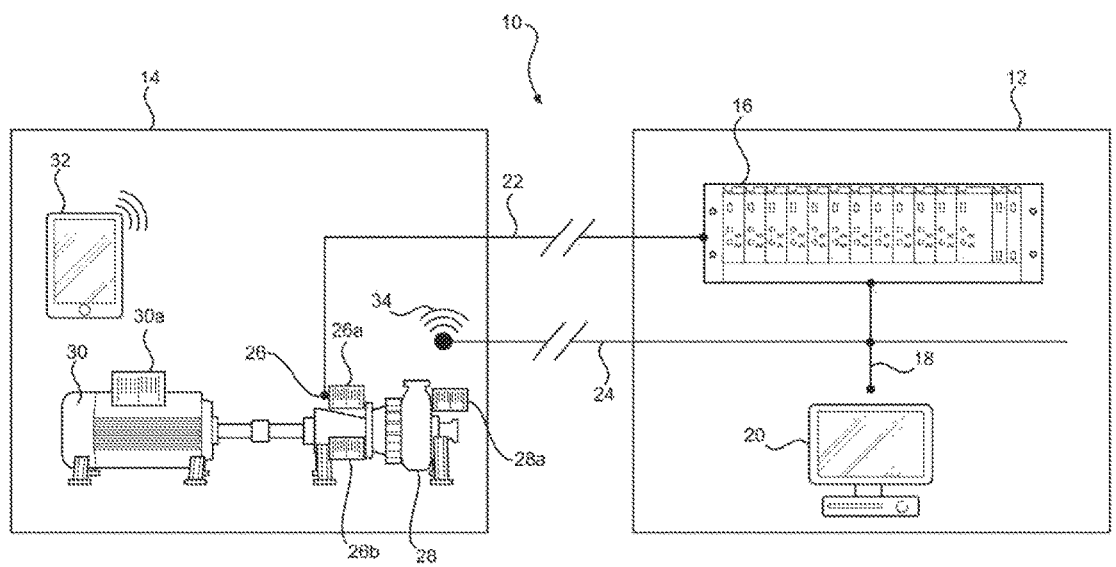
FIG. 1 is a somewhat diagrammatic circuit diagram showing a mobile device and control electronics connected to an asset that includes an electric motor, a pump and a sensor.

Referring now to FIG. 1 there is shown asset system 10 which includes a computer system 12, and includes an asset 14, which in this case includes a pump 28 and an electric motor 30. The computer system 12 includes control electronics 16 connected by a computer communication path 18 to an external computer 20 and to a wireless transceiver 34, such as a Wi-Fi router, by a communications pathway 24. A plurality of sensors 26 are typically connected to the electronics 16 by sensor communication pathways 22. The control electronics 16 is shown in FIG. 1 as a single rack of cards, but it may also represent numerous racks of cards and may represent cards at numerous locations. The control electronics 16 may include machine health electronics, which includes monitoring electronics, predictive maintenance electronics, and protective electronics, and of course the control electronics 16 may provide control functions for the assets 14. Thus, the control electronics 16 may control the operation of assets, monitor the current operating status of assets, predict the future condition or maintenance requirements of the assets, and intervene to protect the assets when abnormal operating conditions are detected. The single sensor 26 in FIG. 1 represents one or more sensors that may be connected to the control electronics 16. In this example, the sensor 26 is mounted adjacent to a bearing of a pump 28 and monitors displacement of the bearing, namely, vibration displacement. A mobile device 32 is also connected to the control electronics 16 through the wireless transceiver 34. The communication pathways 24, 22 and 18 are preferably wired communications pathways, they may also be other types of communication pathways including wireless communication and fiber optics. While the communication pathway between the mobile device 32 and the control electronics 16 is preferably wireless, it too may be connected by wires, fiber optics or other communication pathways.

A machine readable code 26a, such as a bar code or an electronic chip, is mounted on the sensor 26 and the code 26a includes a code, such as a number, to identify the sensor 26. Likewise, a machine readable code 26b is placed adjacent to the sensor to identify a measurement point on the pump 28. The measurement point identifies where on the pump a measurement is taken and also the characteristics of the measurement, such as the front bearing of pump 28, a vertical displacement vibration measurement, etc. Machine codes 30a and 28a are also provided to identify the motor 30 and the pump 28.

The control electronics 16 typically includes a plurality of microprocessor based units (e.g. cards or special-purpose computers) that are used to monitor sensors and communicate with various other devices. One acceptable device for use as control electronics 16 would be a CSI 6500 ATG rack manufactured by Emerson Process Management. The mobile device 32 can communicate with the control electronics 16 either wirelessly or through a wired connection. In addition, the device 32 may communicate with the sensor 26 wirelessly through the control electronics 16 or it may communicate directly with the sensor 26 using a wired link 35. When communicating wirelessly, a sensor signal generated by the sensor 26 is communicated to the control electronics 16 and then relayed back to the mobile device 32, and the mobile device 32 may send commands or information to the sensor 26 by communicating through the control electronics 16.

Figure 2:
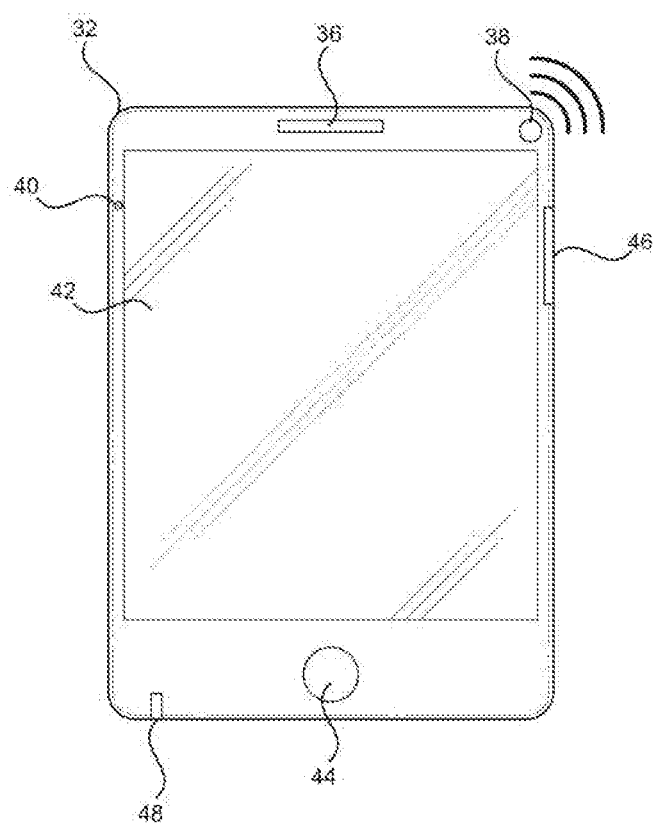
FIG. 2 is a somewhat diagrammatic illustration of a mobile device for communicating with the electronics.

The mobile device 32 is shown in more detail in FIG. 2, and it can be a relatively standard device, such as an industrial tablet, with software and hardware features added to provide functionality. The mobile device 32 includes a speaker 36 for transmitting sound to the user, and a transceiver 38 allows for wireless communication, such as Wi-Fi communication. A machine code reader 46 is a hardware device, such as a mobile camera or light transmitter and reader, that may be used to read a barcode. The reader 46 by also include other types of electronic readers capable of reading electronic codes. A touchscreen 42 is provided for displaying information and for receiving user input commands, and a button 44 is provided for controlling the touchscreen 42 and providing an additional user input. Signals may be applied to the mobile device 32 through the port 48, and for example, signals to and from a sensor may be communicated through the port 48.

Smart Commissioning

Referring again to FIG. 1, the mobile device 32 provides for convenient setup and control of sensors 26 that are typically far removed from the control electronics 16. For example, when the sensors 26 are first installed and commissioned, the mobile device 32 includes programming applications (apps) that facilitate the commissioning of the sensors 26. When the sensors are installed, and electronic code is installed on or near the sensor to identify the particular sensor, and also electronic codes are installed on or near the equipment that is being monitored. In this example, the sensor 26 may include an electronic code that will provide the number "01" when read, and the pump 28 will have an electronic code that provides the number "02" when read. The control electronics 16 may be programmed to know that sensor 26 is identified by the code 01 and that a pump 28 is identified by the code 02, and it and it may also be programmed with the location and other operational and identification parameters of the pump 28. The mobile device 32 may be used to associate a particular sensor with a particular asset and provide that information to the control electronics 16. For example, in this case the mobile device 32 is used to read the codes from both the sensor 26 and the pump 28 and to transmit those two codes to the control electronics 16 such that the 2 codes are associated and the control electronics 16 now associates sensor 26 with the pump 28. It is possible that the control electronics 16 have been previously programmed in a manual way to associate sensor 26 with pump 28. For example, a person may have manually read the code from sensor 26 and the code from pump 28 and made a note. Then the person returned to the computer 20 and programmed a particular card in control electronics 16 to associate sensor 26 with pump 28 and to associate the particular card of the control electronics 16 with sensor 26 and pump 28. However, this manual process is prone to human error. Thus, the process of electronically reading the sensor codes and the pump codes and providing the information electronically to the control electronics 16 will provide a useful check and verification on the manual process.

The mobile device 32 may also be used to set up a particular card in the control electronics 16 to monitor the sensor 26 in a particular way depending upon the situation. The control electronics 16 will include numerous computer applications to monitor numerous different types of sensors, and each of the applications may require certain types of input for performing the monitoring application. To set up the control electronics 16 to monitor a particular system, the correct computer application must be chosen and the correct parameters must be provided to the application for monitoring a particular sensor. The mobile device 32 does not include the numerous monitoring applications, but it does include the identities of the application and it includes the ability to communicate the parameters required for each of the computer applications used by the control electronics 16. For example, assume that the sensor 26 is monitoring vibration of a pump bearing and it is known that the failure of the bearing may be preceded by vibrations within a particular frequency band. Also, it is known that the bearing is operating in a very noisy environment with many spurious vibration signals that may be detected by the sensor 26. Thus, the sensor 26 should be monitored by imposing an electronic filter so that the control electronics 16 will only monitor vibrations in a particular frequency band from X to Y Hertz and will transmit an alarm when vibration within that frequency band exceeds an upper limit of A units.

When the mobile unit 32 is transmitting the codes of sensor 26 and pump 28, it may also use a lookup table to select a particular application for use in monitoring the sensor 26. For example, the mobile unit may provide a menu list of application types, and the user may select "vibration" as the type of application desired. Then, a menu of different subtypes of the vibration applications will be displayed. In this case, the user will select a sub-type application named vibration band filter that provides the ability to band filter the input signal. After selecting the application sub-type, the mobile device will request input from the user as to the upper and lower frequencies of the band filter (X and Y), and it will request input from the user as to the maximum allowable amplitude (A) of the vibration signal within the frequency band before an alert is transmitted. The user then manually inputs the parameters (X, Y and A) and transmits those parameters to the control electronics along with the electronic code identifying the sensor. The control electronics 16 then uses this information to configure itself for properly monitoring the sensor 26. Using the mobile device 32 to completely set up the control electronics 16 to monitor the sensor 26 is optional. The computer 20 may also be used to select a computer application for monitoring a particular sensor.

It will be appreciated that there are numerous ways to use the mobile device 32 to provide information to the control electronics 16. For example, the device 32 may be used to read the electronic codes for a plurality of sensors and associate those sensors with the plurality of different codes for assets. That information may be stored locally in the device 32 without transmitting the code information to the control electronics 16. After a desired number of sensors and associated assets have been read, the mobile device 32 may be connected wirelessly or through a wired connection to the control electronics 16 and all of the paired codes may be downloaded to the control electronics 16 to identify numerous sensor codes and to identify and equipment code for each sensor code.

In summary, to initialize a monitor card of the control electronics 16, the smart commissioning application on the mobile device is opened and the user chooses the initialization application. The user then scans the machine readable code for the sensor and the asset and selects a monitor card for configuring to perform the monitoring function for a particular sensor. Preferably a graphical representation of the available cards are provided on the mobile device so that the user simply touches a particular card to receive the instructions for performing the desired monitoring function. The machine-readable codes are then read at the location of the asset. The codes may include a sensor identification code, and asset identification code, and possibly other codes such as a measurement point identification code. The transmission of the codes is the essential part of the initialization that is performed by the mobile device 32. However, if desired, the mobile device 32 may be used to select the measurement or monitoring application and send the identity of the application plus the parameters needed for the application to the control electronics 16.

Sensor Linearization

The mobile device 32 is also programmed to facilitate the linearization (calibration) of each installed sensor. For example, a typical displacement sensor does not provide sensor signal outputs such that a linear relationship exists between the magnitude of the displacement and the magnitude of the sensor signal. Thus, the control electronics 16 must be programmed with a plurality value pairs that will enable it to interpret accurately the signal from the sensor 26. Each value pair will include a physical displacement of the sensor 26 and the magnitude of the sensor signal. To generate this plurality of value pairs, the user must be physically present at the sensor 26 so that the sensor may be physically moved to create a plurality of displacements and a corresponding plurality of sensor signals. One technique for generating these value pairs is to physically connect the mobile device 32 to the sensor 26 using an input line 35 that is connected to the port 48 on the mobile device 32. The sensor 26 is then displaced by a known first displacement, which the user inputs manually through the inputs on the mobile device 32, such as the touch display 42. For this displacement, the mobile device 32 reads and records a first sensor signal value to generate a first value pair. The sensor 26 is then displaced by a known second displacement, which the user inputs, and the device 32 reads and stores a second sensor signal value to generate a second value pair that is stored locally on the mobile device 32. This process is continued until a desired number of value pairs are generated and stored on the mobile device 32. Thereafter, the desired number of value pairs are transmitted from the mobile device to the control electronics 16, and the control electronics 16 is programmed to use the value pairs to linearize (interpret) the sensor signal and thereby accurately calibrate or linearize each sensor 26=26.

The mobile device may be used to complete the linearization process by slightly different methods. For example, the mobile device may be programmed such that the user can manually input a displacement value associated with a particular sensor 26 and immediately transmit that information to the control electronics 16. When the control electronics 16 receives the displacement value, it monitors the sensor signal until it determines a stable value for that particular displacement value. Then, it generates and stores a value pair which includes a displacement value and a sensor signal value. When the value pair has been determined and stored, the control electronics 16 provides the mobile device with a signal indicating it is ready for the next displacement value. The user then physically moves the displacement sensor to a second known displacement value, and manually enters that second known displacement value and transmits it to the electronics 16. Again, a value pair is determined and stored by the control electronics 16, and the process repeats itself until a desired number of value pairs are stored by the control electronics 16.

A variation of the process described above may be achieved locally using the mobile device 32 by having the mobile device wirelessly communicate with the control electronics 16 and receive the sensor signal values from the control electronics 16. Thus, when the user manually inputs a displacement value into the mobile device 32, the mobile device will simultaneously receive a sensor signal value from the control electronics 16 for that particular sensor and will record a value pair, namely, the displacement value and the sensor signal value. The mobile device can be used to repeat this process until a desired number of value pairs are achieved within the mobile device 32. The process can also be repeated for a number of sensors and all of the value pairs for all of the sensors may be stored within the mobile device 32. Eventually, the user will upload all of the value pairs and sensor identities to the control electronics 16 and the control electronics 16 will use the value pairs and sensor identities to calibrate or interpret the sensor signals from each sensor.

In another variation of the technique described above, the mobile device is used to collect a number of different displacement values and timestamps. For example, a user will go to a sensor 26 and physically displace the sensor by a first known displacement. The user will also manually input the first displacement value associated with both the particular sensor electronic code and with a timestamp. The user will then physically displace the sensor by a second known displacement, input the second known displacement value into the mobile device 32 and associate that second known displacement value with the sensor electronic code and a current timestamp. This process is repeated until a desired number of displacement values and timestamps are collected for a particular sensor. Then, the process may be repeated for each sensor for which linearization is desired. Finally, the user will connect the mobile device 32 to the control electronics 16 through a wired or wireless connection and upload the sensor codes, the displacement values and the timestamps.

Simultaneously with the collection of the displacement values and timestamps as described above, the control electronics 16 is constantly monitoring the sensor signals from all of the sensors and is correlating the sensor signals with time, thereby creating a plurality of time stamped sensor signal values. Thus, the control electronics 16 will create a database of sensor signal values and timestamps for each sensor. When the data from the mobile device 32 is uploaded to the control electronics 16, the control electronics 16 will correlate the displacement values from the mobile device 32 with the sensor signal values detected by the control electronics 16 using the timestamps. In other words, for each sensor, the control electronics 16 will record a particular displacement value for a particular sensor and determine the time in which that displacement value was entered. Then, it will use its own database to identify the particular sensor and will determine the value of the sensor signal at the time the displacement value was entered. A value pair is then created and stored for the particular sensor. This process will be repeated for each displacement value that was transmitted by the mobile device 32 and a plurality of value pairs will be created for use in calibrating or linearizing this particular sensor. The process will be conducted for each of the sensors of the sensor codes that were transmitted by the mobile device 32 and a plurality of different sensors will thereby be calibrated.

While the process of using timestamps appears to be more complicated initially, it will be appreciated that it is probably the most convenient process for use in the field. The user is merely required to displace a particular sensor by a known amount, and then enter the identity of the sensor and the known amount of displacement. This simple process is repeated multiple times for each sensor and a database of displacement values and timestamps will be rapidly created without the need to attach the mobile device 32 to the sensor or communicate with the control electronics 16.

In summary, to linearize a sensor, a user opens the smart commissioning app on the mobile device 32 and chooses the linearization sub-application. The user also connects the mobile device 32 to the user control electronics 16, and the mobile device is used to scan the machine readable code or enter a code and transmit the code to the control electronics 16 which chooses a monitor card based on the sensor code. Alternatively, the user can select a card in the control electronics 16 using a graphical representation of the card. The user then adjusts the sensor manually to a certain displacement and enters that displacement value into the mobile device application. The mobile device application then retrieves the resulting voltage from the sensor 26 directly or indirectly through the control electronics 16. A value pair is then stored in the mobile device 32, the electronics 16 or both. The steps above are repeated until a desired or necessary amount of pairs are entered, and after all value pairs are transmitted to the control electronics 16 the user may instruct the control electronics 16 to configure its application to linearize the sensor based on the value pairs. This communication may be achieved from the mobile device 32 or the computer 20. The sensor is then identified in the control electronics 16 as a linearized sensor in operating condition.

Switch Mode Operation

The smart commissioning mobile app is also programmed to include a switch mode sub-application that enables a user to set one, or a group, or all of the monitor cards of the control electronics 16 into a certain predefined mode, such as a run up/shutdown mode. The switch mode operation can be performed with the push of one button after the mode has been defined. To set up the application originally, the smart commissioning application is opened and a maintenance sub-application is chosen. During the setup process, one or more cards from one or more racks of cards within control electronics 16 are chosen to be subject to the switch mode operation. Next, the maintenance mode is defined by selecting an application that will prevent the machine from being shut down after the switch mode button is depressed.

Once the switch mode operation has been defined, it may be activated by simply choosing the maintenance sub-application and pressing the button. All of the previously identified cards are instructed to enter the predefined maintenance mode and the assets associated with those cards will be prevented from shutting down during maintenance. After maintenance, inspection or some other operation is performed, the user will typically desire to re-activate the default monitoring and protection mode of all monitor cards in the racks of the control electronics 16. To do so, the maintenance sub-application is again chosen and one of the buttons displayed will be a protection mode button that may be pressed to reactivate the default protection and monitoring mode of all cards in the control electronics 16.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiment is chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for monitoring assets comprising:
   sensors disposed on the assets to produce sensor signals corresponding to characteristics of the assets;
   control electronics connected to the sensors for receiving and analyzing the sensor signals and for transmitting information and commands; and
   a mobile device for communicating with the control electronics and sensors;
   the mobile device having an input and being configured and programmed:
   a. to receive on-site data from the input, the on-site data corresponding to sensor identity, asset identity and sensor signals,
   b. to communicate the on-site data to the control electronics, and
   c. to produce and communicate mobile control signals to the control electronics based on user input provided through the input of the mobile device;
   the control electronics being configured and programmed:
   a. with asset data corresponding to the identities and locations of the sensors, identities of the assets, acceptable conditions of the assets, and abnormal conditions of the assets,
   b. for analyzing the sensor signals and determining the condition of the assets based on the asset data,
   c. for transmitting at least one of (1) commands and (2) information if a determined condition of an asset is an abnormal condition,
   d. for receiving and analyzing the on-site data and the mobile control signals, and
   e. for modifying at least one of the (1) transmission of the commands and (2) the analysis of the sensor signals based on one or more of the on-site data and the mobile control signals.

2. The apparatus of claim 1 further comprising wireless transceivers for providing wireless communications between the mobile device and the control electronics.

3. The apparatus of claim 1 further comprising:
   indicia indicating a sensor identity provided on or proximate to one or more of the sensors; and
   wherein the input of the mobile device includes an electronic input capable of reading the indicia and communicating the sensor identity to the mobile device.

4. The apparatus of claim 3 wherein the indicia is machine readable code, which may comprise an electronic chip.

5. The apparatus of claim 1 wherein the mobile device is further configured and programmed to initialize the function of the control electronics with respect to a particular asset by:
   a. identifying the particular asset and one or more associated sensors, and
   b. transmitting information to the control electronics providing the identity of the particular asset and the associated sensors.

6. The apparatus of claim 1 wherein the mobile device is further configured and programmed to initialize the function of the control electronics with respect to a particular asset by:
   a. identifying the particular asset and one or more associated sensors,
   b. transmitting information to the control electronics providing the identity of the particular asset and the associated sensors, and
   c. configuring the control electronics to monitor the associated sensors of the particular asset.

7. The apparatus of claim 5 wherein:
   a. the control electronics includes a plurality of microprocessor-based units programmed to monitor signals from the sensors; and
   b. the mobile device is programmed to configure a particular unit to monitor the sensor signals of a sensor associated with the particular asset based on user inputs into the mobile device.

8. The apparatus of claim 5 wherein:
   a. the mobile device is programmed to select a procedure for monitoring and analyzing sensor signals for a particular sensor in response to user input and to transmit the identity of the selected procedure and the identity of the particular sensor to the control electronics; and
   b. the control electronics is programmed with procedures for monitoring and analyzing sensor signals and is programmed to select a procedure and configure itself to analyze signals from the particular sensor based upon the procedure identity and the identity of the particular sensor transmitted from the mobile device.

9. The apparatus of claim 1 wherein:
   a. a machine readable code is placed at each sensor location containing a number identifying the sensor and a code identifying a measurement point on an asset, and
   b. the input of the mobile device includes a code reader for reading the machine readable code and determining the code identifying the sensor.

10. The apparatus of claim 1 wherein the mobile device is programmed to perform a sensor linearization function by:
    a. storing a code identifying a particular sensor;
    b. receiving and storing a plurality of sensor parameter values corresponding to a parameter being sensed by the particular sensor;
    c. receiving and storing a plurality of sensor signal values corresponding to magnitudes of the sensor signal from the particular sensor at a plurality of times;
    d. associating sensor parameter values with sensor signal values to produce a plurality of paired values;
    e. storing the plurality of paired values in the mobile device; and
    f. transmitting to the control electronics linearization information that (1) includes paired values or (2) includes information based upon the paired values;
    wherein the control electronics is programmed to use the linearization information for linearizing the sensor signal from the particular sensor.

11. The apparatus of claim 1 wherein the mobile device and control electronics are programmed to perform a linearization function by:
    identifying a plurality of sensors and storing the identities of the sensors in the mobile device to produce a sensor identification for each identified sensor;
    receiving and storing a plurality of sensor parameter values and timestamps, each sensor parameter value being associated with a sensor identification and a timestamp;
    storing a plurality of sensor identifications in the control electronics;
    receiving and storing a plurality of sensor signal values and timestamps in the control electronics, each of the sensor signal values being associated with a timestamp and a sensor identification;
    transmitting linearization data from the mobile device to the control electronics, the linearization data including the plurality sensor parameter values, an associated sensor identification for each sensor parameter value, and an associated timestamp for each sensor parameter value;
    using the timestamps and sensor identifications associated with the sensor parameter values and the timestamps and sensor identifications associated with the sensor signal values to correlate the sensor parameter values with the sensor signal values and to thereby associate a sensor signal value with a sensor parameter value to produce a plurality of paired values for a plurality of sensor identifications; and
    using the paired values to interpret the sensor signal from each identified sensor whereby the paired values are used to linearize the correlation between sensor parameters and sensor signal values for each of the identified sensors.

12. The apparatus of claim 1 wherein the mobile device and the control electronics are configured to perform a linearization function by:
    providing communication between the mobile device and the control electronics;
    identifying a sensor with the mobile device and communicating the identity of the sensor from the mobile device to the control electronics;
    receiving on the mobile device a plurality of parameter values for the sensor and transmitting each parameter value from the mobile device to the control electronics;
    receiving at the control electronics a sensor signal from the sensor and storing a value of the sensor signal and a sensor parameter value that was received from the mobile device, so that a plurality of paired values are produced with each paired value containing a sensor parameter value and a sensor signal value; and using the paired values for linearizing the correlation between sensor parameters and sensor signal values for the sensor.

13. The apparatus of claim 1 wherein:
 a. the mobile device is programmed to produce a maintenance command associated with at least one asset as one of the mobile control signals, and
 b. the control electronics is programmed to respond to the maintenance command by modifying the programming of the control electronics to prevent transmission of a particular type of command.

14. The apparatus of claim 13 wherein
 a. the mobile device is programmed to produce a reactivation command associated with at least one asset as one of the mobile control signals, and
 b. the control electronics is programmed to respond to the reactivation command to allow the transmission of the particular type of command.

15. The apparatus of claim 13 wherein the particular type of command is a shut down command that will cause the operation of an asset to shut down.

16. An apparatus of claim 1 wherein the control electronics further comprise at least one of predictive maintenance electronics, protective electronics, and monitoring control electronics.

17. A method for monitoring assets comprising:
 disposing sensors on the assets to produce sensor signals corresponding to characteristics of the assets;
 receiving and analyzing the sensor signals with control electronics and transmitting information and commands based on analysis of the sensor signals;
 communicating with the control electronics and sensors with a mobile device;
 receiving on-site data into the mobile device, the data corresponding to sensor identity, asset identity and sensor signals;
 communicating the on-site data from the mobile device to the control electronics;
 producing and communicating mobile control signals from the mobile device to the control electronics based on user input to the mobile device;
 analyzing the sensor signals using the control electronics and determining the condition of the assets based on the asset data;
 transmitting at least one of (1) commands and (2) information if a determined condition of an asset is an abnormal condition;
 receiving and analyzing the on-site data and the mobile control signals with the control electronics; and
 modifying at least one of the (1) transmission of the commands and (2) the analysis of the sensor signal based on one or more of the on-site data and the mobile control signals.

18. The method of claim 17 further comprising:
 using the mobile device to further configure and program the control electronics to initialize the control electronics with respect to a particular asset by:
 a. identifying the particular asset and one or more associated sensors associated with the particular asset to produce the identity of the particular asset and the associated sensors;
 b. transmitting information from the mobile device to the control electronics providing the identity of the particular asset and the associated sensors; and
 c. configuring the control electronics to monitor the associated sensors of the particular asset using the transmitted information.

19. The method of claim 17 further comprising:
 storing a code identifying a particular sensor in the mobile device;
 receiving and storing a plurality of sensor parameter values in the mobile device, the sensor parameter values corresponding to a parameter being sensed by the particular sensor;
 recording a timestamp in association with each parameter value corresponding to the time at which each parameter value was created;
 receiving and storing a plurality of sensor signal values and timestamps corresponding to the magnitudes of the sensor signal from the particular sensor at a plurality of times;
 using the timestamps to associate stored sensor parameter values with stored sensor signal values to produce a plurality of paired values, each paired value including a sensor parameter value and a sensor signal value; and
 using the paired values to configure the programming of the control electronics to linearize the sensor signal from the particular sensor.

20. The method of claim 17 further comprising:
 producing a maintenance man with the mobile device and transmitting the maintenance command to the control electronics; and
 responding to the maintenance command to modify the programming of the control electronics to prevent the transmission of a particular type of command.

* * * * *